United States Patent
Wintrich et al.

(10) Patent No.: US 7,610,252 B2
(45) Date of Patent: Oct. 27, 2009

(54) METHOD FOR DEVELOPING A PROCESS MODEL

(75) Inventors: Franz Wintrich, Essen (DE); Thomas Vesper, Ilmenau (DE)

(73) Assignee: Powitec Intelligent Technologies GmbH, Essen (DE)

( * ) Notice: Subject to any disclaimer, the term of this patent is extended or adjusted under 35 U.S.C. 154(b) by 283 days.

(21) Appl. No.: 11/837,950

(22) Filed: Aug. 13, 2007

(65) Prior Publication Data
US 2008/0046391 A1 Feb. 21, 2008

(30) Foreign Application Priority Data
Aug. 17, 2006 (EP) .................................. 06017105

(51) Int. Cl.
*G06N 5/00* (2006.01)
(52) U.S. Cl. ........................................ 706/45; 358/539
(58) Field of Classification Search .................. 706/45; 358/539; 600/477
See application file for complete search history.

(56) References Cited

U.S. PATENT DOCUMENTS

| | | | |
|---|---|---|---|
| 5,359,438 A * | 10/1994 | Maeda | 358/539 |
| 5,421,337 A * | 6/1995 | Richards-Kortum et al. | 600/477 |
| 5,481,260 A * | 1/1996 | Buckler et al. | 340/870.09 |
| 7,035,717 B2 | 4/2006 | Wintrich et al. | |
| 7,231,078 B2 | 6/2007 | Wintrich at al. | |
| 2004/0044423 A1 | 3/2004 | Wintrich et al. | |
| 2005/0137995 A1 | 6/2005 | Wintrich et al. | |
| 2005/0147288 A1 | 7/2005 | Wintrich et al. | |
| 2005/0154477 A1 | 7/2005 | Martin et al. | |
| 2006/0024628 A1 | 2/2006 | Wintrich | |

FOREIGN PATENT DOCUMENTS

| | | |
|---|---|---|
| EP | 1 364 164 B1 | 11/2003 |
| EP | 1 396 770 B1 | 3/2004 |
| EP | 1 621 813 A1 | 2/2006 |
| WO | WO 02/070953 A1 | 9/2002 |
| WO | WO 02/077527 A1 | 10/2002 |
| WO | WO 2004/018940 A1 | 3/2004 |

* cited by examiner

*Primary Examiner*—Wilbert L Starks, Jr.
(74) *Attorney, Agent, or Firm*—Womble Carlyle Sandridge & Rice, PLLC

(57) ABSTRACT

A neuronal network is trained using measurement data of state variables comprising measurement data from input channels and measurement data from at least one output channel. The neuronal network is tested using measurement data from the input channels and measurement data from the output channel, and a first standard deviation is determined from the deviations of the predicted values for the output channel from the measurement data of the output channel. The measurement data of at least one input channel are replaced by a distribution. Values for the output channel are again calculated using the distribution or parts thereof and a second standard deviation of the calculated values for the output channel is determined from the associated measurement data. In the case of an increase in the second standard deviation compared with the first standard deviation, the input channel is significant for the neuronal network.

20 Claims, 2 Drawing Sheets

US 7,610,252 B2

METHOD FOR DEVELOPING A PROCESS MODEL

CROSS-REFERENCE TO RELATED APPLICATION

The present application claims priority to EP 06 017 105.5, which was filed Aug. 17, 2006. The entire disclosure of EP 06 017 105.5 is incorporated herein by reference.

BACKGROUND OF THE INVENTION

The present invention relates to a method for developing a process model for regulating a combustion process in a plant, in particular a power plant, a waste incineration plant or a plant for making cement, in which, while air is supplied, material is converted by way of the combustion process with at least one flame being formed, and the state of the system in the plant is described by state variables, with the method comprising setting up a neuronal network; then training the neuronal network using measurement data of the state variables, wherein the measurement data comprises measurement data from input channels and measurement data from at least one output channel; and then testing the neuronal network using further measurement data from the input channels and measurement data from the output channel, with the testing of the neuronal network comprising calculating predicted values for the output channel using the neuronal network and the further measurement data from the input channels, and calculating a standard deviation from deviations of the predicted values for the output channel from the measurement data of the output channel.

In a known method of the type described immediately above, in order to set up the neuronal network, the input channels are empirically selected and then retained in order to ensure a static topology. There is thus a risk that significant channels will not be considered, and also a risk that computing power will be used up for non-significant channels.

BRIEF SUMMARY OF SOME ASPECTS OF THE INVENTION

An aspect of the present invention is the provision of improvements to a method of the type mentioned above, so that the method can run automatically.

In accordance with one aspect of the present invention, a method is provided for developing a process model for regulating a combustion process in a plant (e.g., a power plant, a waste incineration plant or a plant for making cement), in which, while at least oxygen is supplied, material is converted by way of the combustion process with at least one flame being formed, and the state of the system in the plant is described by state variables. In accordance with one embodiment of the present invention, the method can be described as having steps that are described in the following. In a first step, a neuronal network is set up. In a second step, the neuronal network is trained using measurement data of the state variables. The measurement data includes measurement data from input channels and measurement data from at least one output channel. In a third step, the neuronal network is evaluated. The evaluating of the neuronal network during the third step includes calculating first values (e.g., predicted values) for the output channel using the neuronal network and at least some of the measurement data from the plurality of input channels, and calculating a first standard deviation (e.g., "predicted" standard deviation) from deviations of the first values from at least some of the measurement data of the output channel. In a fourth step, a distribution is provided for use in place of measurement data from at least one input channel of the plurality of input channels. In a fifth step, the neuronal network is evaluated again. The evaluating of the neuronal network during the fifth step includes calculating second values for the output channel using the neuronal network and predetermined data. The predetermined data includes at least a portion of the distribution, which was provided at the fourth step for use in place of measurement data from the at least one input channel. The predetermined data typically further includes at least some of the measurement data from input channel(s) other than the at least one input channel. The evaluating of the neuronal network during the fifth step further includes calculating a second standard deviation from deviations of the second values from at least some of the measurement data of the output channel. Then, a determination is made as to whether the at least one input channel is significant for the neuronal network. This determination may be made, for example, by determining whether the second standard deviation is larger than the first standard deviation. The input channel may be deemed to be significant for the neuronal network if, for example, the second standard deviation is larger than the first standard deviation.

In accordance with one aspect of the present invention, the significance of an input channel is determined by testing the predictions of deterioration in the event of failure of the input channel, with the failure being simulated by replacing the input channel by a distribution, in particular in a typical interval. The significance of an input channel is judged in the context of the neuronal network that is set up and trained, so that an input channel that is determined to be significant for a particular neuronal network may not be significant in another network. It is also frequently the case that out of several theoretically equivalent input channels, only one input channel is found to be significant.

The invention can be used, for example, in various stationary thermodynamic plants, in particular power plants, waste incineration plants and plants for making cement.

Other aspects and advantages of the present invention will become apparent from the following.

BRIEF DESCRIPTION OF THE DRAWINGS

The invention is explained in greater detail below with reference to an exemplary embodiment illustrated in the drawings, which are described briefly in the following.

DETAILED DESCRIPTION OF EXEMPLARY EMBODIMENT

Figure 1:
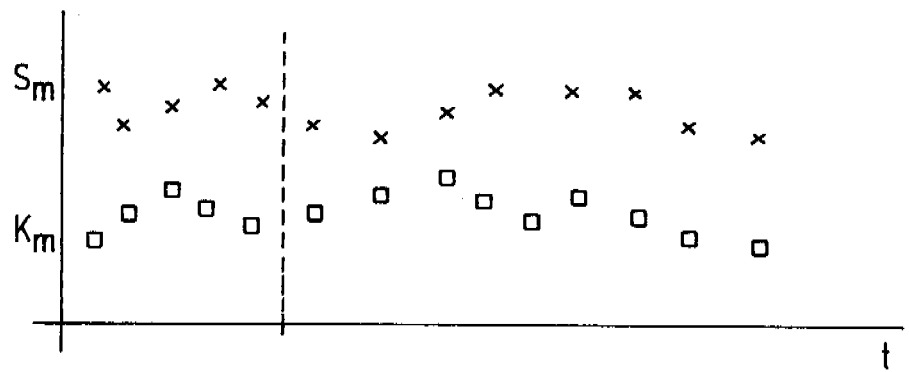
FIG. 1 is a schematic view of measurement data of an input channel and of an output channel.
Figure 2:
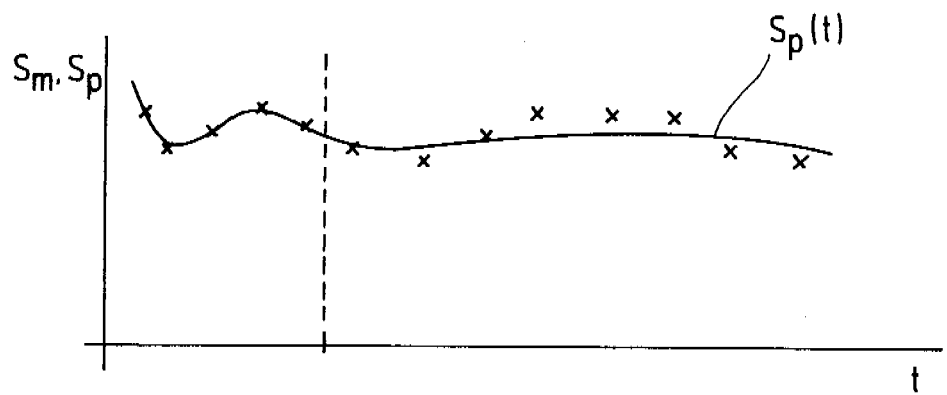
FIG. 2 is a schematic view of the testing of a trained process model showing a comparison of predicted values and measurement data of the output channel of FIG. 1.
Figure 3:
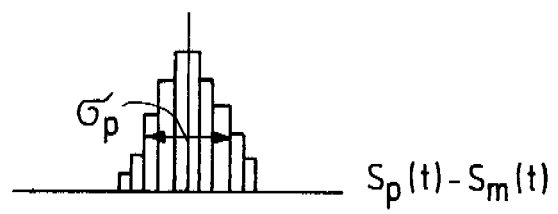
FIG. 3 is a schematic view of the calculation of a standard deviation of the predicted course of the measurement data from FIG. 2.
Figure 4:
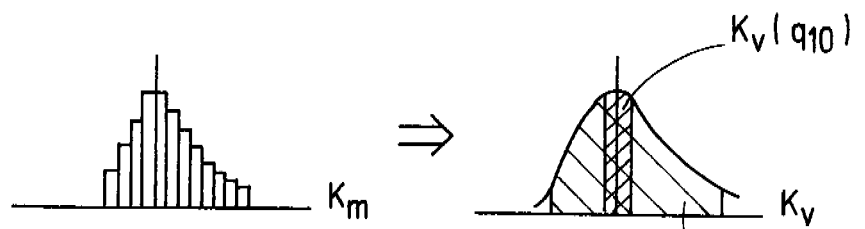
FIG. 4 schematically shows the replacement of the measurement data of an input channel by a distribution and its quantile values.
Figure 5:
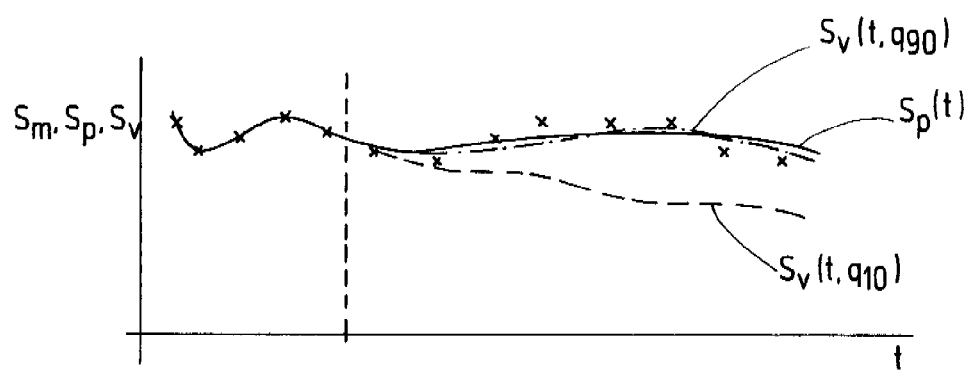
FIG. 5 is a schematic view of the comparison of output channel values, calculated with the distribution and the quantile values, and the values from FIG. 2.
Figure 6:
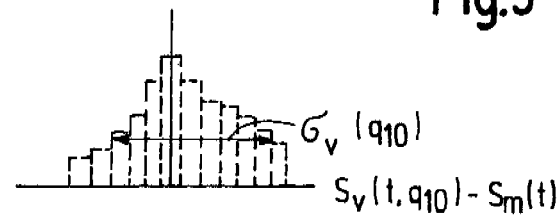
FIG. 6 is a schematic view of the calculation of a standard deviation of the output channel values calculated using a small quantile value.
Figure 7:
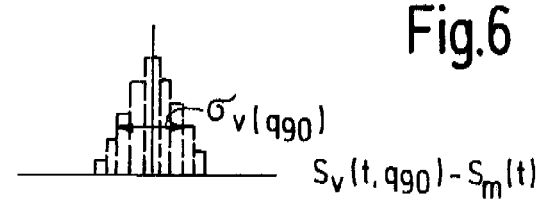
FIG. 7 is a schematic view of the calculation of a standard deviation of the output channel values calculated using a large quantile value.
Figure 8:
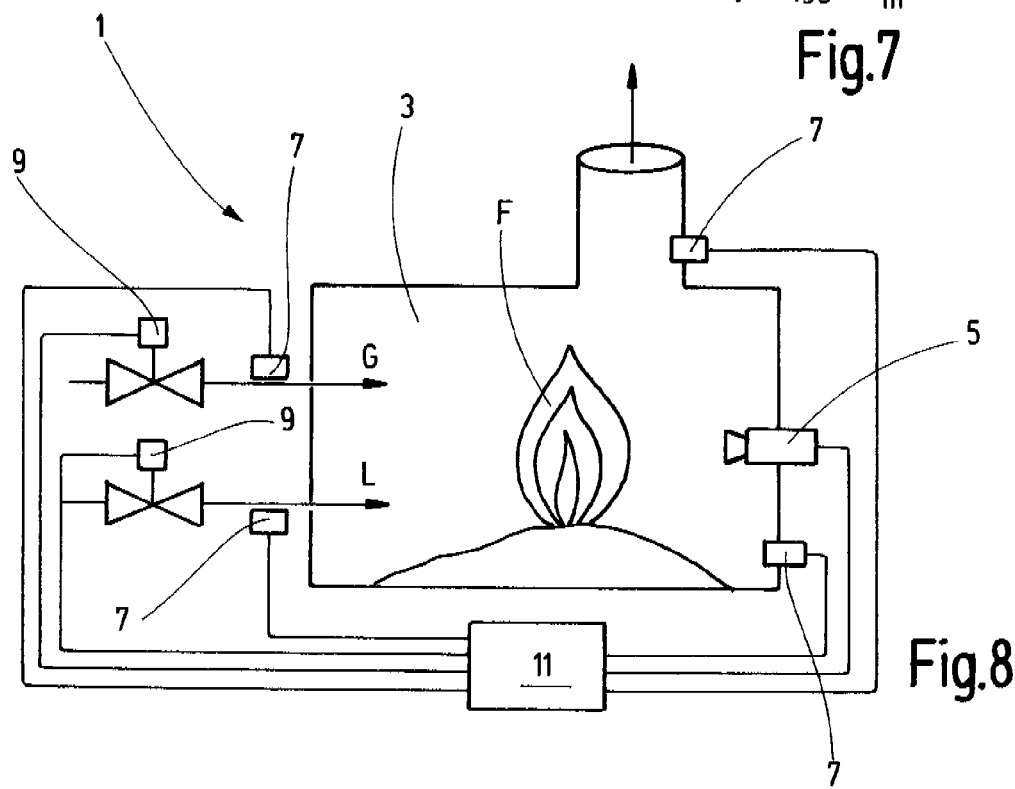
FIG. 8 is a schematic view of a plant.

Referring now in greater detail to the drawings, a plant 1 (e.g., a coal-fired, oil-fired or gas-fired power station, a waste incineration plant or a plant for making cement) comprises a furnace 3 (e.g., which may be in the form of a grate), at least one observation device 5 for providing an image of the interior of the furnace 3 (or the grate), preferably further sensors 7, at least one adjustment device 9, and a computer 11 to which the observation device(s) 5, further sensors 7 and adjustment device(s) 9 are connected.

The furnace 3 is supplied with fuel or any other material to be converted (designated by the reference character "G"), for example coal, oil, gas, waste, lime or the like, as well as primary air (or primary oxygen) and secondary air (or secondary oxygen) (designated by the reference character "L"). The supply of the material G and oxygen L (e.g., air containing oxygen) is regulated by the adjustment devices 9 that are controlled by the computer 11. A combustion process takes place in the furnace 3 (e.g., above the grate). The resulting flame F (e.g., the body of the flame) that is generated (as well as possibly emissions from the walls of the furnace 3) is continuously monitored by the observation device(s) 5. The observation device(s) 5 comprise in each case not only an optical access penetrating the wall of the furnace 3, for example a lance or a device as disclosed in EP 1 621 813 A (which is a member of the same patent family as US 2006/0024628 A1), but also a camera or the like operating in the optical range or in adjacent ranges of the electromagnetic spectrum. The entire disclosure of each of EP 1 621 813 A and US 2006/0024628 A1 is incorporated herein by reference. Preferably a camera with high temporal, high spatial, and high spectral resolution should be used, such as a camera of the type described, for example, in WO 02/070953 A1, which is a member of the same patent family as EP 1 364 164 B1. The entire disclosure of each of WO 02/070953 A1 and EP 1 364 164 B1 is incorporated herein by reference.

The images of the flame F (and of any possible emissions from the walls of the furnace 3) are evaluated in the computer 11, for example according to an eigenvalue method that is described in WO 2004/018940 A1, which is a member of the same patent family as U.S. Pat. No. 7,231,078 B2. The entire disclosure of each of WO 2004/018940 A1 and U.S. Pat. No. 7,231,078 B2 is incorporated herein by reference. The data obtained from the images of the flame F, as well as the data from the other sensors 7, which measure for example the supply of the material G and the oxygen L (e.g., air containing oxygen), pollutant concentrations in the waste gases, or the concentration of free lime (FCAO), are treated as state variables $s(t)$ which (as a function of time) describe the state of the system in the plant 1 in general, and the combustion process in particular, and are to be considered a vector.

The furnace 3 as a (controlled) system, the observation device(s) 5, the further sensors 7, the computer 11 and the adjustment devices 9 define a control loop. It is also possible to provide a conventional control loop comprising just a furnace 3, sensors 7, computer 11 and adjustment devices 9 but without the observation device(s) 5, with the control function of the conventional control loop taking account of just a few state variables $s_t$ (i.e. it is low-dimensional), and then optimize the conventional control loop by incorporating the observation device(s) 5. The system in the plant 1 can be regulated, for example, to achieve certain set-point values or to maintain a stable process (i.e. smooth, quasi-stationary operation of the plant 1). In both cases, the state described by the actual values of the state variables is evaluated and, if necessary, appropriate adjusting actions, referred to in short as "actions", are selected to be carried out by the adjustment devices 9. In addition to supplying material G and oxygen L (e.g., air containing oxygen), other activities performed by the adjustment devices 9, and possibly also a sample-taking, may be considered an action within the meaning of the exemplary embodiment of the present invention. Disturbances can also be treated as undesired actions. Various combinations of the two aforementioned control cases are conceivable; they then represent compromises.

The evaluation of the state and the selection of the appropriate actions can, for example, be carried out according to a process such as that described in WO 02/077527 A1, which is a member of the same patent family as U.S. Pat. No. 7,035,717 B2. The entire disclosure of each of WO 02/077527 A1 and U.S. Pat. No. 7,035,717 B2 is incorporated herein by reference. At least one neuronal network is implemented in the computer 11, and acting as a process model this neuronal network stores the reactions of the states of the system to actions, i.e. the (non-linear) relationships between the values of the state variables at a certain point in time and the actions then taken, on the one hand, and the resulting values of the state variables at a later point in time (i.e. later by a certain interval of time), on the other hand, at as many points in time as possible in the past. In this sense, disturbances can also be included in the process model as (undesired) actions. A situation evaluation, designed as a type of simplified quality function and being independent of the process model (i.e. of the stored relationships) evaluates the values of the state variables for a certain point in time and with respect to given optimization targets (i.e. with respect to determining how close the state of system is to the optimum state at this point in time). By evaluating a predicted state—predicted using the process model as a function of a certain action—at a future point in time, it is possible to determine the suitability of the specific action for approaching the optimization target.

In order to improve the accuracy, not only are the process models continuously updated by the actual developments of the state variables describing a reaction to actions, but there is also competition between several process models regarding the quality of the predictions. For this purpose, alternative process models are developed and trained in the background, for example with other topologies, and their predictions are compared with the currently used process model(s) in order if necessary to replace the currently used process model(s), as is described for example in EP 1 396 770 A1, which is a member of the same patent family as US 2005/0137995 A1. The entire disclosure of each of EP 1 396 770 A1 and US 2005/0137995 A1 is incorporated herein by reference.

A process model that is supposed to arrive at usable predictions in real time does not take account of all the available state variables. Instead, the method according to the exemplary embodiment of the present invention is used to determine which state variables with which parameters are needed and are good enough to develop a good process model, based on a neuronal network, from a given set of data. This significance of state variables is not an absolute characteristic of these state variables but in all cases can only be considered in context with the type and configuration of the neuronal network and with the totality of all the state variables used. If therefore, for example, an RPROP (e.g., a resilient backpropagation algorithm) is used as a neuronal network, either the PROP algorithm ought to be a part of the significance analysis, or a normally trained network should be subjected to an appropriate analysis. The method according to the exemplary embodiment of the present invention is not used to stubbornly test all the numerous possibilities one after another, nor does it use a single training algorithm as the core of a mathematical evaluation that would be valid only for that particular training algorithm.

In a first step, as a starting point, a certain type of neuronal network is selected and a configuration with a probably useful composition of state variables is taken. For better understanding, it may be assumed with regard to the state variables that a rough distinction can be made between input channels K, which tend more to describe the possibilities for influencing the process (e.g., the adjustment parameters), and output channels S, which tend more to describe the results of the process (e.g., the steam generating capacity).

In a second step, some of the data, for example in temporal terms the first 10% of the data, are taken from a set of data that are measured over a period of time and the taken data are used to train the neuronal network. The data that are measured over the period of time can be designated, in short, as measurement data $K_m(t)$ and $S_m(t)$.

In a third step, the neuronal network is tested (e.g., a first evaluation is performed) using the rest of the measurement data $K_m(t)$ and $S_m(t)$, i.e. the neuronal network is tested to determine how well the neuronal network can predict the time course $S_p(t)$ of an output channel S. The scatter of the predicted values $S_p(t)$ around the measurement data $S_m(t)$, i.e. a statistically mean $S_p(t)-S_n(t)$, yields a certain number which is referred to as the predicted standard deviation $\sigma_p$ in the following portion of this Detailed Description section of this document.

Then in a fourth step, singly and alternatingly (e.g., serially) for each input channel, the actual distribution of the measurement data $K_m(t)$—taking into account temporal correlations—is replaced by a distribution $K_v$ of values within an interval between two quantile values $q_j$, i.e. values that correspond to part of the area below the distribution curve, for example 10% or 90% of the area, abbreviated as $q_{10}$ and $q_{90}$.

Using these distributions $K_v$ and their intervals of quantile values $q_j$, the neuronal network is then again evaluated in a fifth step, i.e. using the neuronal network, the values $S_v(t, q_j)$ of the output channel are again calculated, namely—in the case of the quantile values $q_{10}$ and $q_{90}$ which are used as examples—the calculation is carried out stepwise, using to start with only the most frequent 10% of the values $K_v(q_{10})$ of the input channel, then using slightly more values $K_v(q_j)$ and finally using 90% of the values $K_v(q_{90})$, i.e. the range without the tails (e.g., ends) of the distribution $K_v$. With the last calculation of the values $S_v(t, q_{90})$ it should be possible to attain approximately the $S_p(t)$ values predicted on the basis of the $K_m(t)$ measurement data.

For all these calculations of the values $S_v(t,q_j)$ a standard deviation $\sigma_v(q_j)$ of the calculated values $S_v(t, q_j)$ of the output channel is in each case determined from the associated measurement data $S_m(t)$, i.e. a statistical mean $S_v(t,q_j)-S_m(t)$. If these standard deviations $\sigma_v(q_j)$ are greater than the predicted standard deviation $\sigma_p$, i.e. if the calculated values $S_v(t, q_j)$ of the output channel deviate more from the associated measurement data $S_m(t)$ at small $q_j$ values, then the input channel that has been amended by using the distribution $K_v(q_j)$ is significant for the selected neuronal network.

The method according to the exemplary embodiment of the present invention thus determines those input channels that are significant for the selected neuronal network on the basis of a deterioration in the predictions, in each case after replacing an input channel by quantile values of a distribution. Instead of several training runs and in each case several test runs associated therewith, as are required with the known methods, only one training run and a number of test runs, determined by the number of input channels and the subdivision of their distribution into quantile values, need to be carried out in accordance with the exemplary embodiment of the present invention.

In a final step, the neuronal network is modified in such a way that only the significant input channels are taken into account. The neuronal network modified in this way can again be trained using the measurement data $K_m(t)$ and $S_m(t)$.

In the foregoing, some of the above-described steps have been "named" using terms like "first", "second" and so forth, and there may be other descriptions suggestive of an order in which the steps may be formed, in accordance with the exemplary embodiment of the present invention. However, one of ordinary skill in the art will understand that it is within the scope of the present invention for some of the steps to be performed in order(s) different from those described above. As one particular example, the above-described fourth and fifth steps may be performed prior to the above-described third step.

In accordance with the exemplary embodiment of the present invention and as should be apparent to one of ordinary skill in view of the foregoing, the computer 11 (which includes appropriate input and output devices) may control the operation of the plant 1 by virtue of receiving data from and/or providing data (e.g., instructions) to respective components. For this purpose and in accordance with the exemplary embodiment of the present invention, the computer 11 includes or is otherwise associated with one or more computer-readable mediums (e.g., volatile memory and/or non-volatile memory and/or one or more other storage devices such as, but not limited to, tapes and hard disks such as floppy disks and compact disks) having computer-executable instructions (e.g., one or more software modules or the like), with the computer handling (e.g., processing) the data in the manner indicated by the computer-executable instructions. Accordingly, the computer 11 can be characterized as being schematically illustrative of the computer-readable mediums, computer-executable instructions and other features of methods and systems of the exemplary embodiment of the present invention.

It will be understood by those skilled in the art that while the present invention has been discussed above with reference to an exemplary embodiment, various additions, modifications and changes can be made thereto without departing from the spirit and scope of the invention as set forth in the following claims.

That which is claimed:

1. A method for developing a process model for regulating a combustion process in a plant in which, while at least oxygen is supplied, material is converted by way of the combustion process with at least one flame being formed, and a state of a system in the plant is described by state variables, the method comprising:

setting up a neuronal network;

training the neuronal network using at least some measurement data of the state variables, wherein the measurement data comprises measurement data from a plurality of input channels and measurement data from at least one output channel;

performing a first evaluation of the neuronal network, wherein the performing of the first evaluation comprises
 (a) calculating first values for the output channel using the neuronal network and at least some of the measurement data from the plurality of input channels, and
 (b) calculating a first standard deviation from deviations of the first values from at least some of the measurement data of the output channel;

providing a distribution for use in place of measurement data from at least one input channel of the plurality of input channels;

performing a second evaluation of the neuronal network, wherein the performing of the second evaluation comprises
  (a) calculating second values for the output channel using the neuronal network and predetermined data, wherein the predetermined data comprises at least a portion of the distribution, and
  (b) calculating a second standard deviation from deviations of the second values from at least some of the measurement data of the output channel;

determining whether the at least one input channel is significant for the neuronal network, wherein the at least one input channel is significant if the second standard deviation is larger than the first standard deviation.

2. The method according to claim 1, wherein:
the step of providing the distribution comprises providing the distribution over an interval of quantile values as parts of the distribution, and
both the step of performing the second evaluation and the step of determining are carried out with each quantile value.

3. The method according to claim 2, comprising:
selecting a small quantile value, which covers the range of the most frequent values of the distribution, as a limit of the interval; and
selecting a large quantile value, which covers the range without tails of the distribution, as a limit of the interval.

4. The method according to claim 3, comprising:
carrying out predetermined steps of the method for other channels of the plurality of input channels, wherein the predetermined steps include
  (a) the step of providing a distribution,
  (b) the step of performing the second evaluation, and
  (c) the step of determining; and
modifying the neuronal network in such a way that only significant input channels of the plurality of input channels are taken into account.

5. The method according to claim 2, comprising:
carrying out predetermined steps of the method for other channels of the plurality of input channels, wherein the predetermined steps include
  (a) the step of providing a distribution,
  (b) the step of performing the second evaluation, and
  (c) the step of determining; and
modifying the neuronal network in such a way that only significant input channels of the plurality of input channels are taken into account.

6. The method according to claim 1, comprising carrying out predetermined steps of the method for other channels of the plurality of input channels, wherein the predetermined steps include:
the step of providing a distribution,
the step of performing a second evaluation, and
the step of determining.

7. The method according to claim 6, further comprising modifying the neuronal network in such a way that only significant input channels of the plurality of input channels are taken into account.

8. The method according to claim 1, wherein the process model is developed in the background, while a currently used process model serves to regulate the combustion process in the plant.

9. The method according to claim 8, comprising:
determining whether predictions provided by the developed process model are of better quality than predictions provided by the currently used process model; and
replacing the currently used process with the developed process model in response to determining that predictions provided by the developed process model are of better quality than predictions provided by the currently used process model.

10. The method according to claim 1, comprising:
obtaining the measurement data of the state variables, wherein the step of obtaining comprises using at least one observation device that images the flame, and using further sensors;
determining actions to be taken using a computer to evaluate at least some of the measurement data via the neuronal network; and
controlling at least one adjustment device for carrying out the actions to be taken, wherein the adjustment device is for adjusting supplying of material, oxygen, air or any combination thereof.

11. The method according to claim 1, wherein the plant is selected from the group consisting of a power plant, a waste incineration plant, and a plant for making cement.

12. The method according to claim 1, comprising deeming that the at least one input channel is significant for the neuronal network if the second standard deviation is larger than the first standard deviation.

13. A computer-readable medium having computer-executable instructions for performing the method of claim 1.

14. The method according to claim 1, wherein the step of performing the second evaluation occurs before the step of performing the first evaluation.

15. The method according to claim 1, wherein:
the at least one input channel comprises a first input channel;
the plurality of input channels comprises a second input channel; and
the predetermined data, which is used in calculating second values during the step of performing the second evaluation, comprises measurement data from the second input channel.

16. The method according to claim 15, wherein:
the plurality of input channels comprises a third input channel; and
the predetermined data, which is used in calculating second values during the step of performing the second evaluation, comprises measurement data from the third input channel.

17. A control loop apparatus for regulating combustion in a plant in which the combustion converts material and forms at least one flame, the control loop comprising:
a plurality of sensors for obtaining measurement data for state variables, wherein the plurality of sensors is adapted so that the measurement data comprises measurement data from a plurality of input channels and measurement data from at least one output channel, and wherein the plurality of sensors comprises
  (a) at least one observation device, which is for imaging the flame, and
  (b) further sensors;
at least one adjustment device for carrying out actions to be taken, wherein the adjustment device is for adjusting supplying of material, oxygen, air or any combination thereof; and a computer adapted for at least (a) training a neuronal network using at least some of the measurement data, (b) performing a first evaluation of the neuronal network, wherein the performing of the first evaluation comprises (1) calculating first values for the output channel using the neuronal network and at least some of the measurement data from the plurality of input channels, and (2) calculating a first standard deviation from deviations of the first values from at least some of the measurement data of the output channel, (c) providing a distribution for use in place of measurement data from at least one input channel of the plurality of input channels, (d) performing a second evaluation of the neuronal network, wherein the performing of the second evaluation comprises (1) calculating second values for the output channel using the neuronal network and predetermined data, wherein the predetermined data comprises at least a portion of the distribution, and (2) calculating a second standard deviation from deviations of the second values from at least some of the measurement data of the output channel, (e) determining whether the at least one input channel is significant for the neuronal network, wherein the at least one input channel is significant if the second standard deviation is larger than the first standard deviation, and (f) determining the actions to be taken by evaluating at least some of the measurement data via the neuronal network.

18. The control loop according to claim 17, wherein the computer is adapted so that:

the providing of the distribution comprises providing the distribution over an interval of quantile values as parts of the distribution, and both the performing of the second evaluation and the determining of whether the at least one input channel is significant are carried out with each quantile value.

19. The control loop according to claim 18, wherein the computer is adapted for:

selecting a small quantile value, which covers the range of the most frequent values of the distribution, as a limit of the interval; and selecting a large quantile value, which covers the range without tails of the distribution, as a limit of the interval.

20. The control loop according to claim 17, wherein the computer is adapted so that the performing of the second evaluation occurs before the performing of the first evaluation.

* * * * *